Patented Mar. 2, 1937

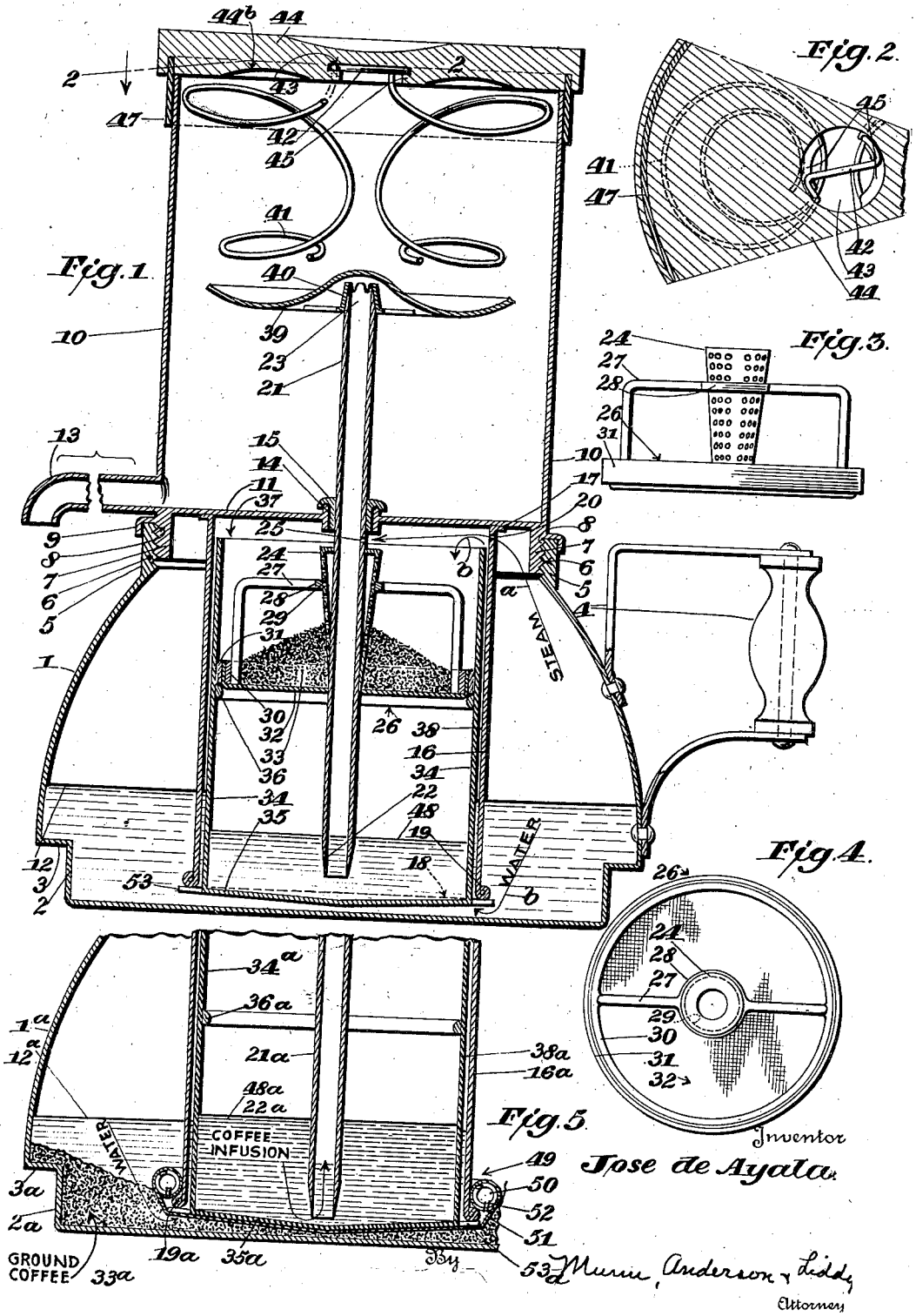

2,072,199

UNITED STATES PATENT OFFICE 2,072,199

COFFEEPOT

José de Ayala, San Juan, P. R.

Application April 11, 1935, Serial No. 15,906

10 Claims. (Cl. 53—3)

This invention relates to improvements in coffee pots, especially of the so-called percolator type, and its objects are as follows:—

First, to provide a coffee pot which is primarily intended for use in making a coffee infusion, there also being a compartment in which one or more eggs may be cooked by heat derived mainly from the hot infusion during the process of preparation.

Second, to provide a coffee pot which has a storage vessel in which a quantity of milk or cream is intended to be stored preparatory to being expelled by the steam which precedes the influx of the coffee infusion into the same storage vessel, the steam pressure also being responsible for then expelling the coffee infusion so that the milk (or cream) and coffee infusion will be mixed.

Third, to provide a coffee pot from which there is no escape for the steam excepting at the spout from which the milk and coffee infusion are discharged, the pressure and heat of the entrapped steam serving to respectively actuate, so to speak, the milk and coffee infusion, and cook one or more eggs.

In the drawing:—

Figure 1 is a central vertical section of the improved coffee pot.

Figure 2 is a detail cross section taken on the line 2—2 of Figure 1, particularly illustrating the detents in the cover recess by which the Z-shaped bridge of the wire egg cage is supported.

Figure 3 is a detail side elevation of the coffee tray.

Figure 4 is a plan view of the coffee tray.

Figure 5 is a detail section of a portion of the coffee pot illustrating an additional mode of making coffee, especially for immediate use, when the coffee pot is used by persons accustomed to boiling ground coffee in water.

The herein disclosed coffee pot is particularly intended for use as an important unit of a certain meal preparing apparatus for which an application for patent was filed by José de Ayala, December 31, 1935, Serial No. 57,055. Out of consideration of this special use the coffee pot is capable of both making a coffee infusion and utilizing the heat of the entrapped steam for cooking one or more eggs. It is desired to make it understood that the foregoing special use is not intended to be a limitation upon the coffee pot because it can be set upon any ordinary burner, and it is optional whether or not eggs shall be cooked, or whether it shall be eggs that will be prepared with the coffee. The heat of the steam can be employed for cooking some other food.

A receptacle 1 has a reduced bottom 2 which leaves an annular flange 3 that will rest upon the surface around a hole in a burner into which the bottom 2 is insertable. The bottom 2 can be set directly upon a burner. A handle 4 is for the obvious purpose of lifting the coffee pot. The receptacle 1 has a mouth 5 of rather large diameter. This is internally threaded at 6.

A circular neck 7 screws into the mouth 5 for which purpose it has external threads 8. An outwardly and downwardly bent circular flange 9 rests upon and covers the rim of the mouth 5 when the two parts are screwed together. The flange 9 is part of the neck 7, and both the neck and flange are part of a compartment 10 in which one or more eggs are adapted to be cooked.

The bottom 11 of the compartment 10 provides a closure for the receptacle 1, entrapping the steam arising from the water 12 when heat is applied. A spout 13 leads off from a point on the compartment 10 close to the bottom 11. This bottom has a centrally affixed collar 14 which receives and frictionally holds a bushing 15.

A cylinder 16 is made integral with the bottom 11 as at 17. This cylinder depends into the receptacle 1, and its lower open end 18 is rolled or beaded as at 19. The cylinder has one or more small holes 20 at a point close to the bottom 11.

A tube 21 has the bushing 15 permanently attached to it. The tube has constricted lower and upper ends 22, 23 which are so made by grinding the extremities on a taper but preserving the internal diameter throughout. This is necessary to facilitate cleaning. The edge of the upper end 23 is scalloped or otherwise interrupted so as to aid the overflow of the liquids. That part of the tube extending below the bushing 15 carries a perforated funnel 24. The funnel is not a part of the tube, but it is adapted to be jammed tightly upon the tube. The funnel is of downwardly tapering form, and close to the large end of the funnel the tube 21 has a small hole 25 which will always remain open. By seating the bushing 15 in the collar 14 the tube 21 is supported in a permanent position with respect to surrounding structure, its lower end coming very near to the bottom of the inner storage vessel without touching.

Said funnel is part of a coffee tray generally denoted 26 (Fig. 3). This tray comprises a bail 27 (Fig. 4). This has a central enlargement 28 which has a round hole 29 (Fig. 1) in which the funnel is inserted and secured so as to make the funnel a part of the coffee tray. The downwardly bent parts of the ball 27 have an inner ring 30 permanently secured to them. This ring and a corresponding ring 31 provide concentric clamp rings between which the margin of a fabric piece 32 is clamped. This piece is the actual bottom of the tray on which the ground coffee 33 is heaped.

A storage vessel 34, generally in the form of a cup inasmuch as it has a bottom 35, is attached to the coffee tray 26 by a frictional grip between the outer ring 31 and the inner wall of the vessel. The storage vessel has bottom lugs 53 which are contactable with the bead 19 to limit the insertion of said vessel. An internal rib 36 in the vessel limits the insertion of the coffee tray. The upper open end 37 of the vessel 34 is in communication with the tray 26. The vessel is smaller than the cylinder 16 in which it is supported by the tube 21, therefore providing an annular water space 38.

A plate 39 has an attached central spider 40 by which the plate is loosely mounted upon the upper constriction 23. The plate is shaped with an annular concavity which is intended to catch any water dripping from the egg cage 41, the central high part of the plate acting as a baffle. This cage is made of a wire bent into spirals which are large above and small below, thereby to hold eggs. The central Z-shaped connecting bridge 42 of the spirals (Fig. 2) is insertable in a central recess 43 in the cover 44 and is given a turn in the proper direction so as to make engagement with a pair of arcuate detents 45 by which the bridge will be held, thereby to permanently secure the egg cage except for cleaning. The cover has a flange 47 which goes down beside the compartment 10 when the cover is emplaced, and on its underside has concavities 44b in which the butt ends of the eggs are held.

The operation is as follows:—It is assumed that all of the main parts of the coffee pot are detached. The desired quantities of water 12 and milk or cream 48 are poured into the respective receptacle 1 and storage vessel 34. Eggs are placed in the cage 41. The tray 26 is pushed into the storage vessel 34 until it rests on the internal rib 36, and forthwith ground coffee 33 is poured into the tray. The storage vessel 34 is then inserted into the cylinder 16 until stopped by the engagement of the lugs 53 with the bead 19. Simultaneously with this insertion the funnel 24 is slid onto and up the tube 21 which was previously inserted in the collar 14.

The compartment 10 is then screwed onto the receptacle 1. The plate 39 is then placed on top of the tube 21. The cover 44, with its egg-carrying unit, is then placed on the compartment 10, whereupon the coffee pot is ready to be placed on the fire.

It is to be observed that in the foregoing assemblage of the parts of the coffee pot the hole 25 was prevented from being closed by the funnel 24 because of the limiting function of the lugs 53 against the bead 19. Further, the friction fit of the ring 31 inside of the storage vessel 34 and the friction fit of the funnel 24 on the tube 21 provide the necessary support of the storage vessel 34 upon the tube 21, these parts virtually becoming a unit.

When heat is applied to the coffee pot expansion of the water 12, milk 48 and air will commence at once. The purpose of the holes 20, 25, which in practice are very small (approximately 1/64 of an inch), is to enable an initial equalization of the internal air pressure. Were it not for these holes the initial expansion of the air in the receptacle 1 would force the water, while still relatively cold, into the vessel 34, the expansion of air in the vessel 34 would force the milk, also relatively cold, up and out of the tube 21. Steam given off by the water at first escapes through the hole 20 (arrow a) and passes off in the tube 21 by way of the hole 25 without going through the ground coffee 33. When boiling of the water commences the volume of steam in the receptacle 1 becomes so great that all of it cannot pass through the hole 20, the resulting pressure on the surface of the water forcing the latter into and up the space 38 and over the edge thereof (arrows b) upon the ground coffee 33.

When this movement of the water is once initiated the milk 48 is also pushed up the tube 21, followed by the coffee infusion, the mixed liquid entering the compartment 10 whence it is conducted away by means of the spout 13. The purpose of the perforations in the funnel 24 is to insure the seepage of water into the core of the pile of ground coffee 33. This avoids the possibility of an uneven penetration of the coffee by the water. Further, the central penetration of water tends to seal the joint between the tube 21 and the fabric bottom 32 of the coffee tray 26 and so prevent the loss of steam pressure required to push the water through the cloth 32.

Naturally the air inside of the compartment 10 will become heated. As the hot coffee infusion passes through the steam liberated thereby will cook the eggs. Drippings from the eggs are caught by the plate 39 so that they will not mingle with the coffee infusion.

In Figure 5 similar principles of construction and operation prevail. Those parts identical with structure already described are similarly numbered but distinguished by the exponent letter a. A modified coffee tray 49 comprises a spring 50, or similar resilient annulus, which has a fabric bottom 51 attached thereto as at 52. The fabric is intended to completely cover the windings of the spring 50.

The ground coffee 33a is now placed in the receptacle 1a. The storage vessel 34a is inserted in the cylinder 16a with respect to which the annular space 38a is maintained as before, but in this instance the vessel 34a is retained by the fabric bottom 51 of the tray 49 which is slipped in place afterward. The tray 26 (Fig. 1) is omitted in the modification.

Assume boiling of the water 12a to have commenced. A coffee infusion is the immediate result because of the original contact of the water with the ground coffee 33a. The steam pressure in the receptacle 1a will force the infusion up the space 38a, the fabric bottom 51 now serving as a strainer. The fabric bottom has a double purpose, the other being to support the vessel 34a, it being understood that it is the tension of the resilient annulus 50 which keeps the fabric bottom in place and keeps the lugs 53 pressed against the beaded edge of the cylinder 16a. Eventually the coffee infusion and milk 48a are forced up and out of the tube 21a into the waiting cup (not shown).

I claim:—

1. A coffee pot comprising a water receptacle, a coffee tray and a storage vessel attached to it, a cylinder spaced around said vessel, a compartment and means by which it is attached to the receptacle, said compartment having a bottom forming a closure for the receptacle and a place of connection for the cylinder, a cover for the compartment, and means carried by said bottom for simultaneously supporting the tray and storage vessel in a suspended position and for conducting fluids from the receptacle side of the bottom into the compartment.

2. A coffee pot comprising a water receptacle to which heat is applicable for producing steam, a compartment fitted tightly upon the receptacle, said compartment having a bottom forming a closure for the receptacle and said compartment being closed with the exception of a spout, a coffee tray to contain a quantity of coffee, means pendent from said bottom providing a support for the tray, said means including a tube carried by and going through the bottom, a storage vessel by which the coffee infusion is caught after contact with the boiling water, said tube extending into said vessel so that the infusion is driven up the tube into the compartment by steam pressure in the receptacle preparatory to flowing out of the spout.

3. A coffee pot comprising a water receptacle, a compartment and means by which it is fitted tightly upon the receptacle, said compartment having a bottom forming a closure for the receptacle, a tube attached medially of its length to the bottom to communicate at its opposite open ends with the respective receptacle and compartment, a coffee tray and means by which the tray is supported by the tube below the bottom, a storage vessel carried by the coffee tray, and a cylinder integral with the bottom, being annularly spaced around said vessel to provide a hot water passage, said cylinder having a hole providing a steam passage.

4. A coffee pot comprising a water receptacle, a compartment and means by which it is tightly fitted upon the receptacle, said compartment including a bottom forming a closure, a tube open at each end to afford communication between the receptacle and compartment and means by which the tube is frictionally carried medially of its length by the bottom, a coffee tray and means by which it is frictionally carried by the tube so as to be suspended below the bottom, a storage vessel frictionally attached to the coffee tray, and a cylinder integral with the bottom, extending around the vessel in annularly spaced relationship to provide a hot water passage, said cylinder having a hole near the compartment bottom to provide a steam passage.

5. A coffee pot comprising a water receptacle and an infusion compartment, said compartment having a bottom which forms a closure for the receptacle, a tube mounted on and going through the bottom, a coffee tray comprising concentric rings, a fabric piece marginally clamped between the rings, a bail attached to one of the rings, and means by which the bail is frictionally attached to the tube; a storage vessel frictionally supported by the coffee tray, said tube extending into said vessel, and means for directing boiling water and steam into the vessel respectively to produce a coffee infusion and to drive the infusion through the tube into said compartment.

6. A coffee pot comprising a water receptacle and an infusion compartment, said compartment having a bottom forming a closure for the receptacle, a tube carried by and going through the bottom, means supported by the tube below the bottom by which the ground coffee is carried, means for directing hot water and steam into said last means for making said infusion and driving it up the tube into the compartment, and a plate carried by the tube providing a baffle over the end of the tube.

7. A coffee pot comprising a water receptacle, a compartment and means by which it is fitted tightly upon the receptacle, said compartment having a bottom forming a closure for the receptacle, a cylinder pendent from the bottom into the receptacle and having a steam hole, a storage vessel spaced inside of the cylinder to provide a fluid passage from the receptacle to the inside of said vessel, a coffee tray and means by which it is frictionally connected inside of the vessel, a tube loosely carried by the bottom, said tube extending from the compartment to the interior of the vessel and having a steam hole, carrying means by which the tray is frictionally attached to the tube beneath the bottom, said means supporting both the tray and vessel, and means on the vessel to contact the cylinder and limit the positioning of the carrying means on the tube so as to clear the respective hole.

8. A coffee pot comprising a water and ground coffee receptacle to which heat is applicable, closure means for the receptacle and a tube carried by the closure means, a cylinder pendent from the closure means, a fabric bottom, a storage vessel in the cylinder into which vessel the tube extends, said vessel having a bottom and being annularly spaced in from the cylinder to provide a fluid passage from the receptacle to the tube, and a resilient annulus by which the fabric bottom is carried, being frictionally attached to the cylinder to support the bottom of the vessel and provide a coffee filter.

9. A coffee pot comprising a water and ground coffee receptacle to which heat is applicable, closure means for the receptacle and a tube carried by the closure means, a cylinder pendent from the closure means, a fabric bottom, a storage vessel in the cylinder into which vessel the tube extends, said vessel having a bottom and being annularly spaced in from the cylinder to provide a fluid passage from the receptacle to the tube, a resilient annulus by which the fabric bottom is carried, being frictionally attached to the cylinder to support the bottom of the vessel and provide a coffee filter, and a plurality of lugs on the vessel limiting the insertion of the vessel into the cylinder to prevent the bottom from closing the adjacent end of the tube.

10. A coffee pot comprising a water receptacle, a compartment and means by which it is fitted tightly upon the receptacle, said compartment having a bottom forming a closure for the receptacle, two elements pendent from the bottom, one a cylinder which has a storage vessel spacedly associated with it to form an annular water space, the other a tube; a fabric bottom, and means by which said fabric bottom is attached to one of said elements.

JOSÉ DE AYALA.